(12) United States Patent
Miyamoto et al.

(10) Patent No.: US 6,774,879 B2
(45) Date of Patent: Aug. 10, 2004

(54) REVERSIBLE IMAGE DISPLAY MEDIUM

(75) Inventors: Hidetoshi Miyamoto, Takatsuki (JP); Keyaki Yogome, Kyoto (JP); Masahiko Matsuura, Suita (JP); Hiroshi Mizuno, Ikoma (JP); Takaji Kurita, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 13 days.

(21) Appl. No.: 09/875,959

(22) Filed: Jun. 8, 2001

(65) Prior Publication Data
US 2002/0009655 A1 Jan. 24, 2002

(30) Foreign Application Priority Data

Jun. 9, 2000 (JP) ........................................ 2000-173088
Jun. 9, 2000 (JP) ........................................ 2000-173091

(51) Int. Cl.$^7$ ................................................. G09G 3/34
(52) U.S. Cl. .......................................... 345/84; 359/296
(58) Field of Search ............................ 345/84, 85, 107; 359/290, 296; 355/400; 434/409; 428/68, 900; 358/300, 301; 430/19, 32, 41; 347/111, 112

(56) References Cited

U.S. PATENT DOCUMENTS

| | | | | |
|---|---|---|---|---|
| 3,875,576 A | * | 4/1975 | Haas et al. | 347/112 |
| 4,126,854 A | | 11/1978 | Sheridon | |
| 4,143,103 A | | 3/1979 | Sheridon | |
| 6,007,734 A | * | 12/1999 | Tazaki et al. | 252/62.54 |
| 6,103,347 A | * | 8/2000 | Nojima et al. | 428/174 |
| 6,330,054 B1 | * | 12/2001 | Ikami | 355/400 |
| 6,333,754 B1 | * | 12/2001 | Oba et al. | 347/112 |

FOREIGN PATENT DOCUMENTS

| | | | | |
|---|---|---|---|---|
| JP | 62-269124 | * | 11/1987 | G02F/1/19 |
| JP | 6-67570 | | 3/1994 | |

OTHER PUBLICATIONS

Gugrae–Jo et al., "*Image Display Using Conductive Toner and Charge Transport Layer*", Japan Hardcopy '99, Jul. 21–23, 1999, Tokyo, Japan, pp. 249–252.

* cited by examiner

*Primary Examiner*—Richard Hjerpe
*Assistant Examiner*—Alexander Eisen
(74) *Attorney, Agent, or Firm*—McDermott Will & Emery LLP

(57) ABSTRACT

This invention provides a reversible image display medium comprising two substrates opposed to each other with a predetermined gap therebetween, one or more developer-accommodating cells formed between the two substrates, and a dry developer accommodated in each cell, in which the dry developer contains at least two kinds of frictionally chargeable dry developer particles having different chargeable polarities and different optical reflection densities, the reversible image display medium having at least any of the following features:

(1) at least one kind of the developer particles being magnetic particles containing a binder resin having a magnetic substance incorporated therein, the magnetic particles having a saturation magnetization degree in the range of 20 emu/g to 50 emu/g;

(2) at least one kind of the dry developer particles has a volume resistivity $\rho$ in the range of $1.0 \times 10^{10}$ $\Omega \cdot$cm to $1.0 \times 10^{14}$ $\Omega \cdot$cm;

(3) the dry developer contains inorganic fine powder as a fluidization agent, the inorganic fine powder having a BET specific surface area of 80 m$^2$/g to 300 m$^2$/g; and (4) the dry developer is accommodated in the cell in an amount of 20 vol. % to 50 vol. % based on the volume of the cell.

19 Claims, 2 Drawing Sheets

REVERSIBLE IMAGE DISPLAY MEDIUM

The present invention is based on patent applications Nos. 2000-173088 Pat., and 2000-173091 Pat. filed in Japan, the contents of which are hereby incorporated by reference.

BACKGROUND OF THE INVENTION

1. Field of The Invention

The present invention relates to an image display medium and more particularly to a reversible image display medium capable of rewriting the images (namely allowing formation, erasure and rewriting of images).

2. Description of The Background Art

At present, the text, graphics or the like produced by a computer, a word processor or the like is displayed on a display such as a CRT display, or is output on a medium such as a paper sheet via a printer for display.

The images displayed by a display such as a CRT display show a low resolution, and the resolution, clarity and precision of images are restricted, as compared with the images displayed by the printer or the like on the paper medium or the like. Due to the relatively low resolution and the light emission from the display, long-time viewing of displayed images may be hard to eyes.

When the text, pictures or the like is displayed on a image display medium of paper or the like, clear images can be displayed in a high resolution, and thus easy-on-the eyes display can be achieved.

For these reasons, the text, graphics or the like produced by a computer, a word processor or the like is output in most cases on a medium such as a paper sheet via a printer for display, whether when the text or the like is skimmed or drafted or when it is output after completion.

The medium of paper or the like bearing images will be abandoned or burnt when it is no longer required. This results in consumption of a large mount of resources. The printer or the like also consume large amounts of consumable products or materials such as toner, ink or heat transfer sheets. For obtaining the new display mediums of paper or the like as well as toner, ink or the like, energies and resources are required for producing them.

This is contrary to the current demand for reduction in environmental loads.

SUMMARY OF THE INVENTION

An object of the present invention is to provide a reversible image display medium which is capable of rewriting (namely which allows image formation, image erasure and image rewriting) and which, therefore, is capable of reducing the amount of consumable products or materials such as paper or like image display media, developers, and ink to be used for conventional image display, namely capable of meeting the current demand for reduction in environmental loads.

Another object of this invention is to provide a reversible image display medium which is capable of forming images with low energy, namely capable of meeting the current demand for reduction in environmental loads.

A further object of the invention is to provide a reversible image display medium which is capable of displaying images in good contrast.

A still further object of the invention is to provide a reversible image display medium which is capable of displaying images in high resolution.

An additional object of the invention is to provide a reversible image display medium which is capable of smoothly providing image display and image erasure, and image rewriting.

A still another object of the invention is to provide a reversible image display medium which is capable of stably displaying images for a long time.

This invention provides the following first to fourth types of reversible image display media.

<First Type Reversible Image Display Medium>

A reversible image display medium comprising:

two substrates opposed to each other with a predetermined gap therebetween;

one or more developer-accommodating cells formed between the two substrates; and a dry developer accommodated in each cell, wherein the dry developer contains at least two kinds of frictionally chargeable dry developer particles having different chargeable polarities and different optical reflection densities, at least one kind of the dry developer particles being magnetic particles containing a binder resin having a magnetic substance incorporated therein, the magnetic particles having a saturation magnetization degree in the range of 20 emu/g to 50 emu/g.

<Second Type Reversible Image Display Medium>

A reversible image display medium comprising:

two substrates opposed to each other with a predetermined gap therebetween;

one or more developer-accommodating cells formed between the two substrates; and a dry developer accommodated in each cell, wherein the dry developer contains at least two kinds of frictionally chargeable dry developer particles having different chargeable polarities and different optical reflection densities, at least one kind of the dry developer particles having a volume resistivity $\rho$ in the range of $1.0 \times 10^{10}$ $\Omega \cdot cm$ to $1.0 \times 10^{14}$ $\Omega \cdot cm$.

The reversible image display media of the invention include reversible image display media having the features of both the first and second types of reversible image display media.

<Third Type Reversible Image Display Medium>

A reversible image display medium comprising:

two substrates opposed to each other with a predetermined gap therebetween;

one or more developer-accommodating cells formed between the two substrates; and a dry developer accommodated in each cell, wherein the dry developer contains a fluidization agent in the form of an inorganic fine powder, the inorganic fine powder having a BET specific surface area of 80 $m^2/g$ to 300 $m^2/g$.

<Fourth Type Reversible Image Display Medium>

A reversible image display medium comprising:

two substrates opposed to each other with a predetermined gap therebetween;

one or more developer-accommodating cells formed between the two substrates; and a dry developer accommodated in each cell, wherein the dry developer is accommodated in the cell in an amount of 20 vol. % to 50 vol. % based on the volume of the cell.

The reversible image display media of the present invention include reversible image display media having the features of both the third and fourth types of reversible image display media.

The foregoing and other objects, features, aspects and advantages of the present invention will become more

BRIEF DESCRIPTION OF THE DRAWINGS

FIG. 1(A) is a section view of an example of the reversible image display medium before displaying images. FIG. 1(B) is a section view of an example of the reversible image display medium when images are displayed.

FIG. 4(A) shows a state of iron flow and FIG. 4(B) shows a stopped state of ion flow.

DESCRIPTION OF THE PREFERRED EMBODIMENTS

Figure 1A:
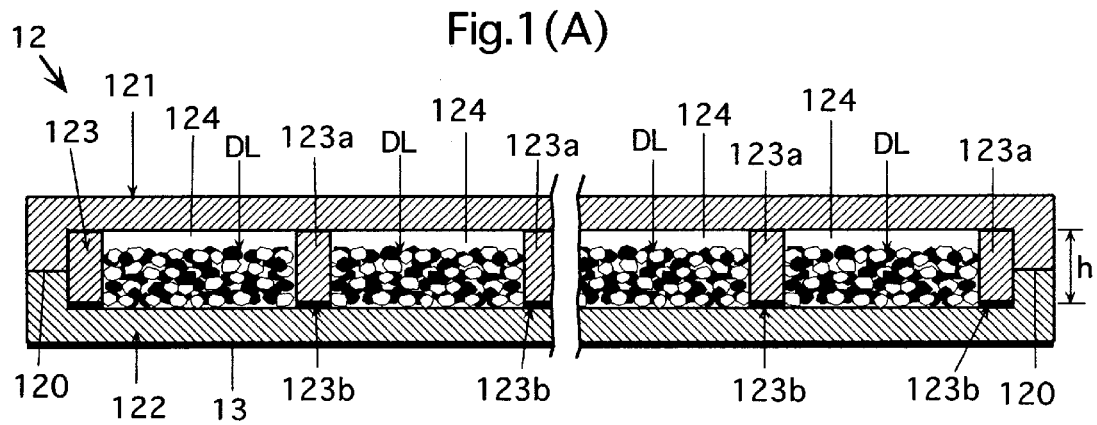
FIGS. 1(A) and 1(B) show an example of the reversible image display medium.

The four types of reversible image display media as preferred embodiments of the invention comprise two substrates opposed to each other with a predetermined gap therebetween, at least one of the two substrates being permeable to light, one or more developer accommodating cells formed between the two substrates and a dry developer accommodated in each cell.

In the first type reversible image display medium, the dry developer contains at least two kinds of frictionally chargeable dry developer particles having different chargeable polarities and different optical reflection densities.

At least one kind of the dry developer particles are magnetic particles containing a binder resin having a magnetic substance incorporated therein, the magnetic particles having a saturation magnetization degree in the range of 20 emu/g to 50 emu/g.

In the second type reversible image display medium, the dry developer contains at least two kinds of frictionally chargeable dry developer particles having different chargeable polarities and different optical reflection densities, at least one kind of the dry developer particles having a volume resistivity $\rho$ in the range of $1.0 \times 10^{10}$ $\Omega \cdot cm$ to $1.0 \times 10^{14}$ $\Omega \cdot cm$.

A reversible image display medium having the features of both the first and second reversible image display media is one of the preferred embodiments of the invention.

In the third type reversible image display medium, the dry developer contains a fluidization agent in the form of an inorganic fine powder, the inorganic fine powder having a BET specific surface area of 80 $m^2/g$ to 300 $m^2/g$.

In preparing the third type reversible image display medium, the inorganic fine powder may be added to the developer (in other words, the powder may be added to the developer already prepared). However, it is desirable to add the inorganic fine powder to at least one kind of developer particles (in other words, it is desirable that after addition of the inorganic fine powder to at least one kind of developer particles, a developer is prepared using the developer particles).

In the fourth type reversible image display medium, the dry developer is accommodated in the cell in an amount of 20 vol. % to 50 vol. % based on the volume of the cell.

A reversible image display media having the features of both the third and fourth types of reversible image display media is one of the preferred embodiments of the invention.

[1] First and Second Types of Reversible Image Display Media

In any of the first and second types of reversible image display media, a predetermined electrostatic field corresponding to the image to be displayed is formed for each pixel and is applied on the frictionally charged developer particles of the image display medium so that a Coulomb force acting on the charged developer particles can move the developer particles for development to display the image.

In the case of the medium incorporating the developer particles containing magnetic particles, the developer can be stirred by passing the medium through the magnetic field, whereby the medium is initialized, the fluidity of the developer is triggered and the charging performance is enhanced.

In any of the foregoing first and second types of reversible image display media, the developer particles contained in the cell is frictionally charged, and this state can be achieved by frictionally charging the developer particles by mixing or stirring operation prior to the accommodation of the developer particles in the cell, or by frictionally charging the developer particles by the mixing or stirring operation, which is executed by application of an appropriate energy, after the accommodation of the developer particles in the cell. Also, both procedures described above can be conducted for frictionally charging the developer particles.

The electrostatic field for forming images can be produced, for example, by forming an electrostatic latent image directly or indirectly (e.g. by transferring the electrostatic latent image formed on an electrostatic latent image carrier) on the outer surface of one of the two substrates, or by contacting an independently formed electrostatic latent image with the outer surface of the substrate to form an electrostatic field based on the electrostatic latent image. The electrostatic field may be formed, simultaneously with or subsequently to formation or contact of the electrostatic latent image on or with the outer surface of one of the substrates. The electrostatic field may be formed, e.g., by placing a predetermined potential on the substrate, which is opposite to the substrate for carrying or contacting with the electrostatic latent image. This predetermined potential can be placed by applying the bias voltage to the above opposite substrate, or grounding the opposite substrate.

In the first and second types of reversible image display media, after displaying the image, a different electrostatic field, an alternating electric field, an oscillating magnetic field (in the case of magnetic particles being present) or a combination of two or more of them may be formed so that the image can be erased. Also, the image can be rewritten by forming a different electrostatic field.

Accordingly, it is not necessary to abandon the image display medium, on which the image is already displayed. The developer particles are contained in the cell(s), and are not consumed so that external supply of the developer is not required. Owing to these facts, it is possible to reduce remarkably the use of the conventional image display media such as paper sheets as well as consumable materials such as conventional developers.

In contrast to the conventional image formation of the electrophotographic type or the like, it is not necessary to melt the toner for fixing it onto a sheet of paper or the like, and a majority of the image forming energy, which is required in such an image forming process in the prior art, is not required.

Owing to the above features, the media can satisfy the current demand for reduction in environmental loads.

In any of the first and second types of reversible image display media, the developer contained in the cell includes at least two kinds of developer particles having different optical reflective densities, and in other words, exhibiting different contrasts or different colors. Further, the developer particles are dry particles, and one kind of the developer particles can appropriately screen or hide the other kind of developer particles. Therefore, image display in good contrast can be achieved.

The developer contained in the cell includes at least two kinds of the chargeable dry developer particles, which can be frictionally charged to have different chargeable polarities. For image display, the developer particles which are mutually reversely charged by the frictional charging are moved by the Coulomb force. This also achieves the display in good contrast, and can suppress remaining of the last image.

The media can display images in a high contrast compared with conventional rewritable display of electrophoresis type or twist ball type.

The dry developer particles can suppress settling and condensation thereof as compared with, e.g., electrically conductive toner in a display liquid used for electrophoretic image display, because a liquid is not present. This also suppress lowering of the contrast of the image display, and can perform stable image display for a long time. Since the settling and condensation of the developer particles are suppressed, the remaining of the last image can be suppressed. As compared with developer particles in a liquid, the dry developer particles can perform stable image display also for the reason that the charging performance thereof changes with time to a smaller extent.

As compared with the image display by a conventional CRT display or the like, easy-on-the-eyes image display in high resolution can be performed.

In the first and second types of reversible image display media, the image display is performed by forming the electrostatic field for the developer particles while at least two kinds of the developer particles contained in each cell are charged to have mutually opposite polarities by frictional charging. This promotes movement of the particles so that low drive potential for image display can be employed and energy required for the image display can be low.

In the first type reversible image display medium, the dry developer contains at least two kinds of frictionally chargeable dry developer particles having different chargeable polarities and different optical reflection densities. At least one kind of the dry developer particles are magnetic particles containing a binder resin having a magnetic substance incorporated therein, the magnetic particles having a saturation magnetization degree in the range of 20 emu/g to 50 emu/g.

If the magnetic particles have a saturation magnetization degree of less than 20 emu/g, a low magnetic force is exerted by the outer magnetic field on the developer particles in the medium, so that the developer can not be efficiently stirred, resulting in a tendency to lower the density of displayed images. If the magnetic particles have a saturation magnetization degree of more than 50 emu/g, the magnetic particles can scarcely be moved by a Coulomb force acting on the developer in stirring the developer in the medium by the outer magnetic field and are magnetically controlled, leading to a likelihood for the magnetic particles to align in a chain form along the outer magnetic field. This lowers the efficiency of stirring the developer and reduces the image density.

Useful magnetic substances are, for example, ferromagnetic elements, alloy or compounds containing the element. Examples thereof are conventionally known magnetic substances such as magnetite, hematite, ferrite or like alloys or compounds of iron, cobalt, nickel, manganese, etc., other ferromagnetic alloy, etc. The magnetic substances may have various shapes such as particles, needles, thin flat shapes, etc. and are suitably usable.

If the charging performance of the developer particles present in the reversible image display medium is not stabilized, the Coulomb force acting on the developer particles would change, making it impossible to obtain a stable image density.

In the second type reversible image display medium, the dry developer contains at least two kinds of frictionally chargeable dry developer particles having different chargeable polarities and different optical reflection densities, at least one kind of the dry developer particles having a volume resistivity $\rho$ in the range of $1.0\times10^{10}$ $\Omega\cdot$cm to $1.0\times10^{14}$ $\Omega\cdot$cm which results in the following advantage.

In the case where the dry developer particles contained in a reversible image display medium are frictionally chargeable as in the medium of the embodiment, the charging performance of the developer particles is markedly changed by the electrical resistance (or electrical conductivity) of the particles, and repeated image display would be likely to change the image contrast and image reflection density. However, the second type reversible image display medium can confine the volume resistivity of developer particles to the foregoing range, and can inhibit the change of image contrast and image reflection density due to repeated image display, so that images of high quality can be repeatedly displayed for a longer period of time.

If two kinds of frictionally chargeable dry developer particles having different chargeable polarities and different optical reflection densities, have a volume resistivity $\rho$ of less than $1.0\times10^{10}$ $\Omega\cdot$cm, the electrical insulating property of developer particles is too low to maintain the charging level. This suppresses the movement of the developer particles in the electrostatic field, and suppresses the image density. Further, after displaying images, a Coulomb force can scarcely act on the developer particles and the image-retaining stability is lowered.

If two kinds of frictionally chargeable dry developer particles have a volume resistivity $\rho$ of more than $1.0\times10^{14}$ $\Omega\cdot$cm, the charging amount of the frictionally charged developer particles is markedly increased, so that an excessively great Coulomb force is exerted on the developer particles after displaying images, and the images are likely to remain after erasure operation.

Due to these defects, the image density tends to vary in repeated image formation and erasure.

The electrical resistance of the developer particles can be controlled, for example, by dispersing a resistance adjusting agent in the binder constituting the developer particles or optionally by firmly fixing a resistance adjusting agent to the surface of developer particles (for example, the resistance adjusting agent can be fixed to the surface of the developer particles by a hot air application using a Surfusing System manufactured by NPK (Nippon Pneumatic Mfg. Co., Ltd.)).

Resistance adjusting agents include similar compounds to coloring agents. Examples of resistance adjusting agents are metal oxides, graphite, carbon black, etc. having various shapes such as thin flaky, fibrous or powdery shape, etc. In the case of magnetic particles, the resistance can be adjusted by varying the amount of magnetic particles to be used.

Examples of materials which can be used in preparing developer particles will be collectively described later.

In any of the first and second types of reversible image display media, an electrode (preferably, transparent electrode) may be formed on the inner surface of one of substrates having light transparency, and an electrode opposed to the above electrode may be arranged on the inner surface of the other substrate. In this case, a predetermined electrostatic field corresponding to the image to be displayed is formed for each pixel between the electrodes by applying a voltage across the electrodes. Thereby, a Coulomb force can move the developer particles to display images. Also, the image can be erased and rewritten. The electrode on the inner surface of the other substrate may be formed of a group of independent electrodes formed for the respective pixels.

In any of the first and second types of reversible image display media, each of the two substrates has a large area compared with its thickness, and provides an expanded plane. These substrates may be made of various materials such as synthetic resin, glass or the like, and may be soft, flexible or less flexible (e.g., glass). At least one of the two substrates, which is located on the image observation side, has light transparency for allowing viewing of images. Both substrates may have light transparency. A developer movement suppressing member for suppressing lateral movement of the developer particles in the developer accommodating cell may be arranged between the two substrates. Naturally, the partition wall defining the cell suppresses the lateral movement of the developer.

The partition wall defining the developer accommodating cell and/or the developer movement suppressing member may also serve as spacers for maintaining the predetermined gap between the two substrates. A spacer dedicated to the function of maintaining the predetermined gap between the two substrates may be employed independently of the partition wall and the developer movement suppressing member.

Provision of the developer movement suppressing member suppresses local collection of the developer particles in the cell so that images of high quality can be displayed with less image irregularities. Since the spacer maintains the predetermined gap between the two substrates, image display with less image irregularities can be achieved. The developer movement suppressing member may have any form such as a columnar form or a wall-like form.

Regardless of whether the electrodes are present or not, specific restrictions are not imposed on the number of the developer accommodating cells in the reversible image display medium as well as the size, form, distribution, arrangement (regularity or irregularity) or the like, provided that the image display can be performed. The same can be true with respect to the developer movement suppressing member and the dedicated spacer.

Each of the partition wall, the developer movement suppressing member and the dedicated spacer may be at least partially fixed by an adhesive or the like to at least one of the two substrates, or may be formed integrally with the substrate by molding or the like. However, each of the partition wall, developer movement suppressing member and the dedicated spacer may be arranged between the substrates without being adhered by the adhesive to one or both of the two substrates, or without being integrated with the substrate, and may be simply arranged to be unmovable with respect to at least one of the substrates.

The developer accommodating cell may have a shape such as a continuous groove type or an independent type.

The substrate, cell partition wall, developer movement suppressing member, spacer and others may be made of various unlimited materials. However, in the case of, e.g., forming an electrostatic latent image for image display on the medium surface (substrate surface), at least the substrate carrying the electrostatic latent image is an insulating substrate. The other substrate on the opposite side may be an insulating substrate or another kind of substrate, regardless of whether the electrode is provided or not. If the ground potential or a bias voltage must be placed on the other insulating substrate, an electrically conductive film may be formed on the outer surface of the substrate, or the substrate may be entirely made of an electrically conductive material or a material containing an electrically conductive material, although these are not essential. By employing the above manner or structure, the substrate can be easily grounded to carry the ground potential, or the bias voltage can be easily applied to the substrate. Regardless of whether the electrode is employed or not, an effect of externally shielding the electrical charges by the substrate on the opposite side can be achieved, if the substrate on the opposite side is an insulating substrate, and is provided at its outer surface with the electrically conductive film, or if the substrate itself on the opposite side is the electrically conductive substrate. Thereby, even in the case where the media on which images are displayed are overlapped together, collapsing of the images can be suppressed, and thereby the images can be stably held.

[2] Third and Fourth Types of Reversible Image Display Media

Typical examples of the third and fourth types of reversible image display media include electric field-driving type of reversible image display media in which images are formed by driving the developer particles by an electric field (electrostatic field) to be applied according to the images to be formed.

Examples of electric field-driving type of reversible image display media are:

(a) a reversible image display medium in which an electrical charge is injected in a charge-injectable developer particles, which are driven by the electric field; and (b) a reversible image display medium like the first and second types of reversible image display media, in which the dry developer contains at least two kinds of frictionally chargeable dry developer particles having different chargeable polarities and different optical reflection densities.

Regarding the reversible image display medium (b) containing the frictionally chargeable dry developer particles, images are formed and the developer particles accommodated in the cell(s) are frictionally charged in the same manner as done for the first and second types of reversible image display media. The electric field or electrostatic field for forming images can be formed in the same manner as in first and second types of reversible image display media.

Any of the third and fourth types of reversible image display media may have electrodes for forming an electric field. For example, an electrode (preferably, transparent electrode) may be formed on one of substrates having light transparency, and an electrode opposed to the above electrode may be arranged on the other substrate. In this case, a predetermined electrostatic field corresponding to the image to be displayed is formed for each pixel between the electrodes by applying a voltage across the electrodes. Thereby, a Coulomb force can move the developer particles to display images. Also, the image can be erased and rewritten. The electrode on the inner surface of the other substrate may be formed of a group of independent electrodes formed for the respective pixels.

In the third and fourth types of reversible image display media, after displaying the image, a different electrostatic field, an alternating electric field, an oscillating magnetic field (in the case of magnetic particles being present) or a combination of two or more of them may be formed so that the image can be erased. Also, the image can be rewritten by forming a different electrostatic field.

Accordingly, it is not necessary to abandon the image display medium, on which the image is already displayed. The developer particles are contained in the cell, and are not consumed so that external supply of the developer is not required. Owing to these facts, it is possible to reduce remarkably the use of the image display media such as paper sheets as well as consumable materials such as developers in the prior art.

In contrast to the conventional image formation of the electrophotographic type or the like, it is not necessary to melt the toner by heat for fixing it onto a sheet of paper or the like, and a majority of the image forming energy, which is required in such an image forming process in the prior art, can be saved.

Owing to the above features, the current demand for reduction in environmental loads can be met.

In the case of the reversible image display media containing frictionally chargeable dry developer particles, the developer contained in the cell includes at least two kinds of developer particles having different optical reflective densities (in other words, exhibiting different contrasts or different colors). Further, the developer particles are dry particles, and one kind of the developer particles can appropriately screen or hide the other kind of developer particles. Therefore, image display in good contrast can be achieved.

The developer contained in the cell includes at least two kinds of the chargeable dry developer particles, which can be frictionally charged to have different chargeable polarities. For image display, the developer particles which are mutually reversely charged by the frictional charging are moved by the Coulomb force. This also achieves the display in good contrast, and can suppress remaining of the last image.

The dry developer can achieve a high contrast compared with conventional rewritable electrophoretic display or twist ball type display.

The dry developer particles can suppress settling and condensation thereof as compared with, e.g., the above-mentioned electrically conductive toner in a display liquid used for electrophoretic image display, because a liquid is not present. This also suppress lowering of the contrast of the image display, and can perform stable image display for a long time. Since the settling and condensation of the developer particles are suppressed, the remaining of the last image can be suppressed. As compared with the developer particles in a liquid, the dry developer particles can perform stable image display also for the reason that the charging performance thereof changes with time to a smaller extent.

The image display is performed by forming the electrostatic field for the developer particles while at least two kinds of the developer particles contained in each cell are frictionally charged to have mutually opposite polarities. This promotes movement of the particles so that low drive potential for image display can be employed and energy required for the image display can be low.

The third and fourth reversible image display media are such that as compared with the image display by a conventional CRT display or the like, easy-on-the-eyes image display in high resolution can be performed.

In the third type reversible image display medium, the dry developer contains a fluidization agent in the form of an inorganic fine powder, the inorganic fine powder having a BET specific surface area of 80 $m^2$/g to 300 $m^2$/g.

Thereby the fluidity of the developer is improved so that the developer particles can be more quickly and assuredly driven, whereby the images can be smoothly displayed, erased and rewritten.

As described above, the fluidization agent may be added to at least one kind of the developer particles. For example, in the case of the image display medium containing the frictionally chargeable dry developer particles, namely the medium containing at least two kinds of frictionally chargeable dry developer particles having different chargeable polarities and different optical reflection densities, the fluidization agent is incorporated into at least one kind of the dry developer particles, and the fluidization agent-containing dry developer particles may be mixed with the other kind of the developer particles. If magnetic particles and non-magnetic particles are used as two kinds of the developer particles, preferably the fluidization agent is added to the non-magnetic particles.

Examples of fluidization agents are inorganic fine powder which are usually added to developers for use in electrophotographic image formation such as silica, alumina, titanium oxide, barium titanate, magnesium titanate, calcium titanate, strontium titanate, zinc oxide, siliceous sand, clay, mica, wallastonite, diatomaceous earth, chromium oxide, cerium oxide, red iron oxide, antimony trioxide, magnesium oxide, zirconium oxide, barium sulfate, barium carbonate, calcium carbonate, silicon carbide, silicon nitride, etc.

Preferred fluidization agents are fine powder of silica, aluminum oxide, titanium dioxide or magnesium fluoride. These fluidization agents can be used either alone or in combination.

The inorganic fine powder of fluidization agent has a BET specific surface area of 80 $m^2$/g to 300 $m^2$/g. If the inorganic fine powder is outside the above range in BET specific surface area, a proper fluidity can not be exhibited and a satisfactory developing ability can not be shown. Specific examples of fluidization agents which meet this requirement are as follows.

AEROSIL 130, AEROSIL 200, AEROSIL 200V, AEROSIL 200CF, AEROSIL 300, AEROSIL 300CF, TT600, MOX50, MOX80, MOX170, COK84, R202, R972, R974, R805, R812, Aluminum Oxide C (products of Nihon Aerosil Co., Ltd.), TARANOX-500 (Taraco Co., Ltd.), H2000 (Wacker Co., Ltd.), etc.

In the fourth type reversible image display medium, the dry developer is accommodated in the cell in an amount of 20 vol. % to 50 vol. % based on the volume of the cell. The dry developer used in this amount has a fluidity improved without a problem in image display. This feature assures quick driving of developer particles, consequently resulting in smooth image display, erasure and rewriting.

If the packing density is less than 20 vol. %, a hollow space occupies a large area of the cell interior. This raises a problem, for example, that in solid white display, the color (e.g. black) of an underlying layer is seen through a surface white layer. Accordingly, it is responsible for deterioration of contrast. Further, when the display medium is inclined or shaken, the developer is locally collected, leading to impairment of image quality.

On the other hand, as the packing density increases, the hollow space in the cell decreases and resistance to the movement of developer particles is raised, thereby lowering the rate of image display. If the amount of developer particles filled in the cell exceeds 50 vol. %, for example, complete phase separation would not occur between the white particles and the colored (e.g. black) particles in image display, namely it may be responsible for impairment of contrast. Consequently the packing density of the developer in the cell is in the range of preferably about 20 vol. % to about 50 vol. %, and more preferably about 25 vol. % to about 40 vol. % from the viewpoint of display rate.

In the third and fourth types of reversible image display media, especially, in the electric field-driving type reversible image display media in which the developer particles are driven by a Coulomb force, at least one kind of developer particles may be magnetic particles. For example, in the foregoing image display medium containing the frictionally chargeable dry developer particles, at least one kind of frictionally chargeable dry developer particles having different chargeable polarities and different optical reflection densities may be magnetic particles.

The reversible image display medium containing the magnetic particles is passed through a magnetic field in the formation of images, thereby stirring the developer, whereby the medium is initialized, the fluidity of the developer is triggered for forming images and charging performance is enhanced in the medium containing frictionally chargeable dry developer particles.

The desired magnetism can be imparted to the developer particles, e.g., by dispersing a predetermined amount of a magnetic substance such as magnetic powder or particles into the binder resin constituting the developer particles.

Useful magnetic substances include those exemplified above.

The materials which can be used in preparing the developer particles are collectively described later.

In any of the third and fourth types of reversible image display media, each of the two substrates has a large area compared with its thickness, and provides an expanded plane. These substrates may be made of various materials such as synthetic resin, glass or the like, and may be soft, flexible or less flexible (e.g., glass). At least one of the two substrates, which is located on the image observation side, has light transparency for allowing viewing of images. Both the substrates may have light transparency. A developer movement suppressing member for suppressing lateral movement of the developer particles in the developer accommodating cell may be arranged between the two substrates. Naturally, the partition wall defining the cell suppresses the lateral movement of the developer.

The partition wall defining the developer accommodating cell and/or the developer movement suppressing member may also serve as spacers for maintaining the predetermined gap between the two substrates. A spacer dedicated to the function of maintaining the predetermined gap between the two substrates may be employed independently of the partition wall and the developer movement suppressing member.

Provision of the developer movement suppressing member suppresses local collection of the developer particles in the cell so that images of high quality can be displayed with less image irregularities. Since the spacer maintains the predetermined gap between the two substrates, image display with less image irregularities can be achieved. The developer movement suppressing member may have any form such as a columnar form or a wall-like form.

Regardless of whether the electrodes are present or not, specific restrictions are not imposed on the number of the developer accommodating cells in the reversible image display medium as well as the size, form, distribution, arrangement (regularity or irregularity) or the like, provided that the image display can be performed. The same can be true with respect to the developer movement suppressing member and the dedicated spacer.

Each of the partition wall, the developer movement suppressing member and the dedicated spacer may be at least partially fixed by an adhesive or the like to at least one of the two substrates, or may be formed integrally with the substrate by molding or the like. However, each of the partition wall, developer movement suppressing member and the dedicated spacer may be arranged between the substrates without being adhered by the adhesive to one or both of the two substrates, or without being integrated with the substrate, and may be simply arranged to be unmovable with respect to at least one of the substrates.

The developer accommodating cell may have a shape such as a continuous groove type or an independent type.

The substrate, cell partition wall, developer movement suppressing member, spacer and others may be made of various unlimited materials. However, in the case of, e.g., forming an electrostatic latent image for image display on the medium surface (substrate surface), at least the substrate carrying the electrostatic latent image is an insulating substrate. The other substrate on the opposite side may be an insulating substrate or another kind of substrate, regardless of whether the electrode is provided or not. If the ground potential or a bias voltage must be placed on the other insulating substrate, an electrically conductive film may be formed on the outer surface of the substrate, or the substrate may be entirely made of an electrically conductive material or a material containing an electrically conductive material, although these are not essential. By employing the above manner or structure, the substrate can be easily grounded to carry the ground potential, or the bias voltage can be easily applied to the substrate. Regardless of whether the electrode is employed or not, an effect of externally shielding the electrical charges by the substrate on the opposite side can be achieved, if the substrate on the opposite side is an insulating substrate, and is provided at its outer surface with the electrically conductive film, or if the substrate itself on the opposite side is the electrically conductive substrate. Thereby, even in the case where the media on which images are displayed are overlapped together, collapsing of the images can be suppressed, and thereby the images can be stably held.

In the electrophoresis type display, two substrates are opposed together with a spacer therebetween to form a closed space therebetween, and the space is filled with a display liquid formed of a dispersion medium and particles having electrophoretic mobility, which are dispersed in the dispersion medium and are different in color from the medium. The image display is performed in a color of the particles or a color of the dispersion medium by an application of an electric field corresponding to the image to be displayed to move the particles in the display liquid.

The twist ball-type display is known as a gyricon-base electronic paper display. The medium usually has a sheet-like form and is disclosed, e.g., in U.S. Pat. Nos. 4,126,854 and 4,143,103 although not restricted thereto. The medium comprises two-color spherical balls each having two hemispherical surfaces different in color from each other, the ball being surrounded with a liquid, wax or the like and being enclosed in a cavity of an insulating property holding medium such that the two-color ball is rotated in the cavity according to its electrical anisotropy to thereby display image by application of an external electric field corresponding to the image.

Materials which can be used in preparing developer particles are described below.

Binder Resin

The binder resin is not specifically limited insofar as it is usable as a binding agent. Binding resins which are usable for electrophotography toner are used as a representative example.

Examples of useful binder resins are polystyrene type resins, poly(meth)acrylic type resins, polyolefin type resins, polyamide type resins, polycarbonate type resins, polyether type resins, polysulfone type resins, polyester type resins, epoxy resins, urethane resins, urea resins, fluorine-containing resins, silicone resins and copolymers, block polymers, graft-polymers and polymer blend, etc. of these resins.

The binder resin may have a considerably high glass transition temperature (Tg) and needs not be a thermoplastic resin.

Coloring Agent

As the coloring agents, the following various kinds of organic or inorganic pigments and dyestuffs having various colors are usable.

Examples of black pigments are carbon black, copper oxide, manganese dioxide, Aniline Black and activated carbon, etc.

Examples of yellow pigments are chrome yellow, zinc yellow, cadmium pigment such as cadmium yellow or the like, yellow iron oxide, mineral Fast Yellow, Nickel Titan Yellow, Naphthol Yellow S, Hansa Yellow G, Hansa Yellow 10G, Benzidine Yellow G, Benzidine Yellow GR, Quinoline Yellow Lake, Permanent Yellow NCG and Tartrazine Lake, etc.

Examples of orange pigments are red chrome yellow, molybdenum orange, Permanent Orange GTR, Pyrazolone Orange, Vulcan Orange, Indanthrene Brilliant Orange RK, Benzidine Orange G and Indanthrene Brilliant Orange GK, etc.

Examples of red pigments are red iron oxide, cadmium pigment such as cadmium red or the like, red lead, mercury sulfide, Permanent Red 4R, Lithol Red, Pyrazolone Red, Watchung Red, Lake Red D, Brilliant Carmine 6B, eosine lake, Rhodamine Lake B, alizarin lake and Brilliant Carmine 3B, etc.

Examples of violet pigments are manganese violet, Fast Violet B and Methyl Violet Lake, etc.

Examples of blue pigments are prussian blue, cobalt blue, Alkali Blue Lake, Victoria Blue Lake, Phthalocyanine Blue, Phthalocyanine Blue containing no metal, partially chlorinated Phthalocyanine Blue, Fast Sky Blue and Indanthrene Blue BC, etc.

Examples of green pigments are chrome green, chromium oxide, Pigment Green B, Malachite Green Lake and Final Yellow Green G, etc.

Examples of white pigments are zinc white, titanium oxide, antimony white and zinc sulfide, etc.

Examples of extender pigments are barite powder, barium carbonate, clay, silica, white carbon, talc and alumina white, etc.

Examples of various kinds of dyestuffs such as basic, acidic, disperse and substantive dye are Nigrosine, Methylene Blue, Rose Bengale, Quinoline Yellow and Ultramarine Blue, etc.

These coloring agents are usable either alone or in a combination of plural of them.

Especially in white-black display, carbon black is preferable as a black coloring agent and titanium dioxide as a white coloring agent.

Especially in case of preparing developer particles from a mixture of a white pigment and a meltable binding resin (binder resin), it is preferable to use the white pigment in an amount of at least 10 parts by weight, preferably at least 20 parts by weight, per 100 parts by weight of raw monomer of white particles, in order to obtain sufficient whiteness. It is desirable to use the white pigment in an amount of up to 60 parts by weight, preferably up to 50 parts by weight, in order to secure sufficient dispersibility of the white pigment. Over 60 parts by weight of the white pigment, the binding degree between the pigment and the binding resin will decrease and the dispersibility of the pigment will deteriorate. Less than 10 parts by weight of the white pigment, the developer particles having a different color will not sufficiently be shaded by the pigment.

Although carbon black is preferable as the black coloring agent, it is possible to use magnetic particles or magnetic fine powder such as magnetite, ferrite, etc. as the coloring agent in order to impart magnetic characteristic to the developer particles.

Charge-Controlling Agent

The charge-controlling agent is not specifically limited insofar as it gives a charge to the developer particles by friction-charging.

Examples of plus-charge-controlling agents are Nigrosine dye, triphenylmethane compound, quaternary ammonium salt compound, polyamine resin, imidazole derivative, etc.

Examples of minus-charge-controlling agents are salicylic acid-metal complex, metal-containing azo dye, metal-containing oil-soluble dye (including metal ion or metal atom), quaternary ammonium salt compound, calixarene compound, boron-containing compound (benzilic acid-boron complex), nitroimidazole derivative, etc.

Other than the above, as charge-controlling agents are usable metal oxides such as ultrafine silica particles, ultrafine titanium oxide particles, ultrafine alumina particles, etc., nitrogen-containing cyclic compounds such as pyridine or its derivative, salt, various organic pigments, resins containing fluorine, chlorine, nitrogen, etc.

Magnetic Substance

Magnetic substances aforementioned are usable.

Resistance Adjusting Agent

Resistance adjusting agents aforementioned are usable.

Explained below is an example of preparing developer particles.

Prescribed amounts of components selected from the above binder resin, magnetic powder, coloring agent, charge-controlling agent, resistance adjusting agent and other additives are mixed thoroughly. The mixture is kneaded with heating by use of press-kneader, twin-screw kneader device, etc. After cooled, the mixture is roughly pulverized with use of hammer mill, cutter mill, etc. and then finely pulverized with use of jet mill, angmill, etc. The resulting powder is classified by a wind classifier, etc. to a predetermined average particle size to obtain developer particles.

A developer having a predetermined amount of charges is obtained by mixing and stirring the thus obtained particles having different chargeable polarities and contrasts (optical reflection densities) at a predetermined rate thereof. The developer can be used for an electric field-driving type reversible image display medium containing frictionally chargeable dry developer particles.

A third component (particles) such as fluidity improving agent may be added thereto or mixed therewith.

Useful fluidity improving agents include the fluidization agents exemplified hereinbefore for the third and fourth types of reversible image display media.

[3] Reversible Image Display Media

Examples of reversible image display media are described below with reference to the accompanying drawings.

[3-1]

Figure 1B:
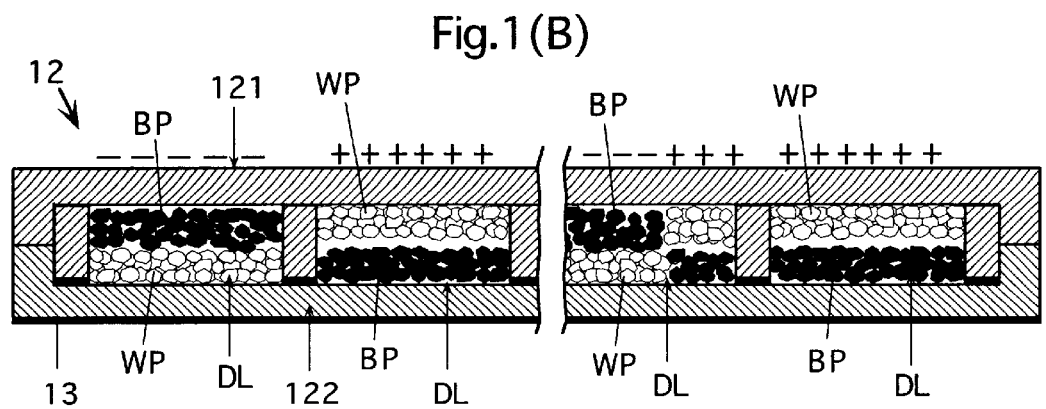
Figure 2:
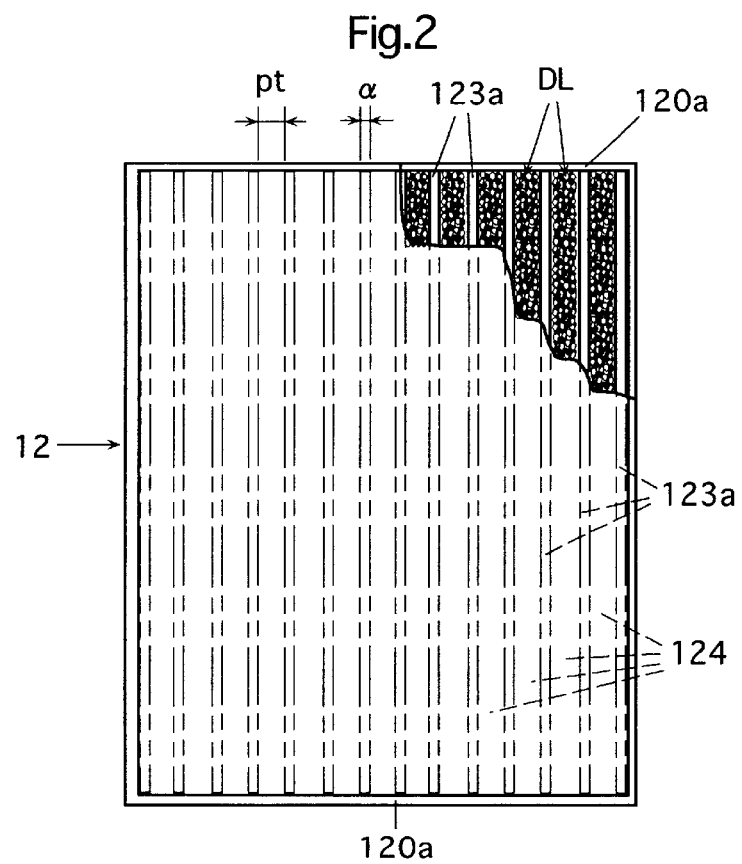
FIG. 2 is a partially cutaway plan view of the reversible image display medium shown in FIG. 1(A).

FIGS. 1(A) and 1(B) and FIG. 2 show an example of the reversible image display medium containing the dry chargeable developer particles. FIG. 1(A) is a section view of a reversible image display medium 12 prior to image display. FIG. 1(B) is a section view of an example of the reversible image display medium during image display. FIG. 2 is a partially cutaway plan view of the medium 12.

The reversible image display medium 12 shown in these drawings is rectangular as a whole, and includes a first substrate 121, a second substrate 122, and a partition wall 123 formed between the two substrates. The first substrate 121 and the partition wall 123 are integrally formed from transparent polyethylene terephthalate (PET) by heat-extrusion molding. The second substrate 122 is also a transparent PET substrate and has an aluminum vapor deposition layer 13 as an electrically conductive film on the external surface.

The partition wall 123 includes a plurality of lengthwise partition walls 123a extending in parallel with two lengthwise sides of the medium 12. Developer accommodating cells 124 are defined between neighboring lengthwise partition walls 123a. Each cell accommodates a developer DL containing mutually frictionally charged white developer particles WP and black developer particles BP.

The two substrates 121, 122 are heat-sealed in the periphery of the medium 12 to form sealed portion 120. Sealed portions 120a of the portion 120 closing both ends of the lengthwise cells also serve as partition walls defining the cell 124.

Each cell is tightly closed to prevent the leakage of developer DL.

The partition wall 123 (partition walls 123a) can be used also as spacers for maintaining the predetermined gap between the two substrates 121, 122.

The substrate 121 has an average thickness of 25 μm. The partition walls 123a are 20 μm in width (α), 100 μm in height (h), and 200 μm in the spacing (pt) between the adjacent partition walls 123a. The developer DL is accommodated in each cell 124 at a charging rate of 34 vol. %. The upper end surface of lengthwise partition walls 123a on the substrate 121 is coated with a photo-curing adhesive agent 123b to form a thin film, and an aluminum vapor deposition substrate 122 of 30 μm in thickness is adhered to the thin film. The adhesive agent is cured by UV irradiation and the substrates are heat-sealed in the periphery.

The developer particles and developer in the cells are described below in detail.

White Developer Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Co., Ltd.: CR-50) and 5 parts by weight of salicylic acid-zinc complex (minus-charge-controlling agent, Orient Chemical Co., Ltd.: Bontron E-84). The mixture was kneaded by a twin-axis extruder and then cooled. The mixture was roughly pulverized, then pulverized by a jet mill and classified with wind to obtain white fine powder which has a volume average particle size of 10.3 μm. To the white fine powder was added 0.3 part by weight of hydrophobic silica particles (Nihon Aerosil Co., Ltd.: Aerosil R-972). The mixture was mixed by a Henschel mixer to prepare white developer particles WP as shown below in Table 1. The white developer particles had a volume resistivity ρ of $1 \times 10^{15}$ Ω·cm.

TABLE 1

| | White Particles WP | | | | |
|---|---|---|---|---|---|
| bindr resin (parts by weight) | Titanium Oxide (parts by weight) | Bontron-E84 (parts by weight) | hydophobic silica R972 (parts by weight) | average particle size (μm) | resistivity ρ (Ω·cm) |
| 100 | 40 | 5 | 0.3 | 10.3 | $1 \times 10^{15}$ |

Black Developer Particles BP

In a Henschel mixer were thoroughly mixed 100 parts by weight of styrene-n-butyl methacrylate resin (softening point: 132° C., Tg: 65° C.), carbon black in the amount shown in Table 2 (Lion Oil & Fat Co., Ltd.: Ketchen Black EC), silica in the amount shown in Table 2 (Nihon Aerosil Co., Ltd.: #200) and magnetic powder containing magnetite in the amount shown in Table 2 (RB-BL-P, Titan Kogyo Co., Ltd.). The mixture was kneaded by a kneader.

The mixture was cooled, roughly pulverized by a feather mill, then finely pulverized by a jet mill and classified with wind to obtain black particles BP1 to BP11 having a volume average particle size of about 25 μm to about 26 μm as shown in Table 2.

TABLE 2

| | Black Magnetic Particles BP | | | | | | |
|---|---|---|---|---|---|---|---|
| BP No. | bindr resin parts by weight | magnetic powder RB-BL-P parts by weight | carbon black parts by weight | silica Aerosil #200 parts by weight | average particle size (μm) | saturated magnetization σs (emu/g) | resistivity ρ (Ω·cm) |
| 1 | 100 | 200 | 12 | 1.5 | 26 | 36 | $1.62 \times 10^{9}$ |
| 2 | 100 | 200 | 10 | 1.5 | 26 | 35.9 | $1.22 \times 10^{10}$ |
| 3 | 100 | 200 | 6 | 1.5 | 26 | 35.8 | $9.22 \times 10^{11}$ |
| 4 | 100 | 200 | 3 | 1.5 | 26 | 35.8 | $8.92 \times 10^{13}$ |
| 5 | 100 | 200 | 2 | 1.5 | 25 | 36.2 | $1.10 \times 10^{14}$ |
| 6 | 100 | 200 | 0 | 1.5 | 26 | 36 | $1.10 \times 10^{15}$ |
| 7 | 100 | 200 | 4 | 1.5 | 26 | 35.9 | $1.62 \times 10^{13}$ |
| 8 | 100 | 50 | 6 | 1.5 | 25 | 19.5 | $2.00 \times 10^{13}$ |
| 9 | 100 | 100 | 4 | 1.5 | 25 | 26.5 | $4.27 \times 10^{13}$ |
| 10 | 100 | 300 | 2 | 1.5 | 25 | 41.5 | $4.68 \times 10^{12}$ |
| 11 | 100 | 500 | 0 | 1.5 | 25 | 57.8 | $1.26 \times 10^{11}$ |

Preparation of Developer DL

The white particles WP (30 g) and each of the black particles BP1 to BP11 (70 g) were placed into a polyethylene bottle. The bottle was rotated by a ball mill pedestal to perform the kneading and mixing for 30 minutes to obtain 11 types of developers. The white developer particles WP were negatively charged and black developer particles BP were positively charged in each developer.

Using the obtained developers as the developer DL in the reversible image display medium 12 of FIG. 1(A), there were obtained media of Examples 1 to 3 and media of Comparative Examples 1 and 2, and media of Examples 4 to 7 and media of Comparative Examples 3 to 5. The particulars of the media are shown in Tables 3 and 4.

Figure 3:
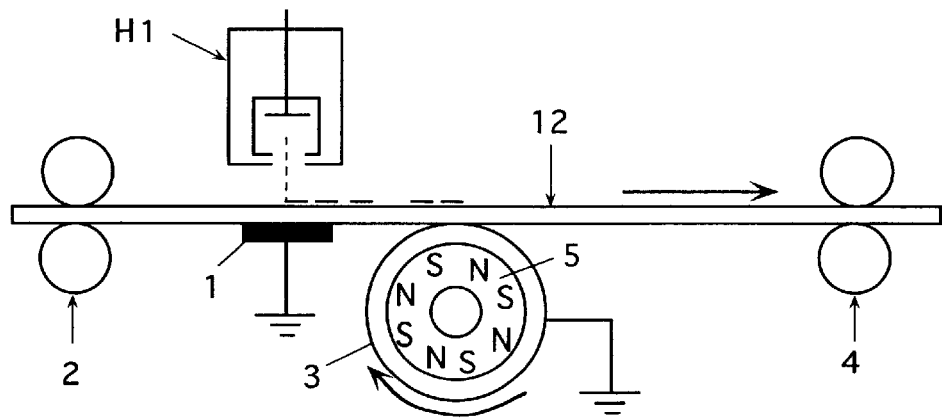
FIG. 3 schematically shows the structure of a device for forming images, which is used in image evaluation experiments.

Medium evaluation tests were carried out to evaluate the media of examples and media of comparative examples using an image-forming device shown in FIG. 3.

FIG. 3 shows an image-forming device using an ion flow head H1.

The ion flow head H1 is provided at a specified location above a medium-transporting path. A ground counter electrode 1 opposed to the head H1 is laid on the underside of the path. A pair of timing rollers 2 are disposed upstream of the head H1. An electrode roller 3 which is driven to rotate is provided on the underside of the path downstream of the head H1. Further downstream, a pair of transporting rollers 4 are disposed. The electrode roller 3 is grounded and is internally provided with a magnet roller 5 which is driven to rotate independently of the roller 3.

Figure 4A:
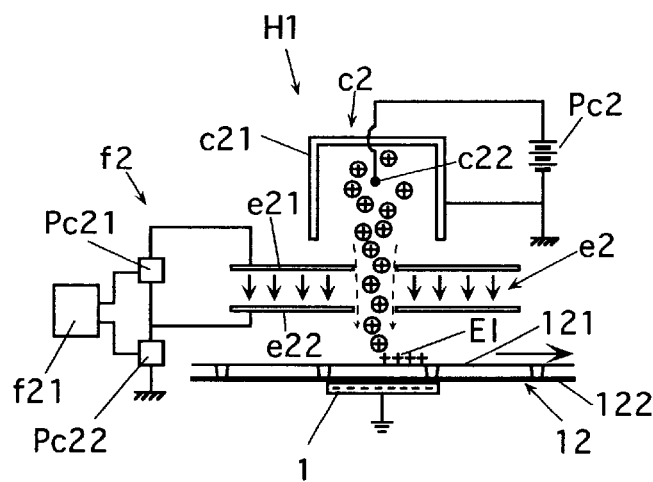
FIGS. 4(A) and 4(B) are enlarged views of an ion flow head in the device of FIG. 3.
Figure 4B:
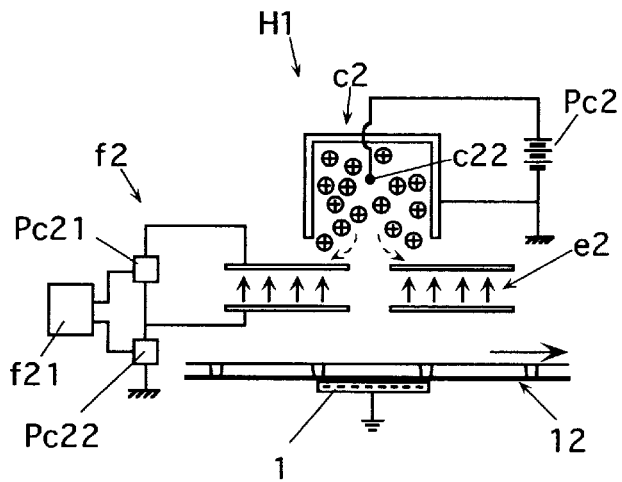

The detail of the ion flow head H1 is shown in FIGS. 4(A) and 4(B).

The ion flow head H1 includes, as shown in enlarged view in these drawings, a corona ion generating portion c2 for generating corona ions, a write electrode e2 for leading the corona ions generated by the ion generating portion onto the surface of the medium 12, and a write electrode control circuit f2 for applying to the write electrode e2 the voltage, which is used for leading the positive or negative corona ions to the pixel corresponding portion on the surface of the medium 12 in accordance with the image to be displayed.

The corona ion generating portion c2 includes a shield casing c21 and a corona wire c22, which is stretched in the casing 21. A high-voltage power source Pc2 applies a positive or negative voltage (e.g. positive or negative voltage of about 4 kV to about 10 kV) to the wire c22 for generating the corona ions. The corona wire c22 is formed of, e.g., a gold-plated tungsten wire of 60 $\mu$m to 120 $\mu$m in diameter.

The write electrode e2 is opposed to a portion of the shield casing c21 directed toward the medium 12. The write electrode e2 is formed of upper and lower electrodes e21 and e22, and is provided at its center with a transparent hole, through which the corona ions can flow.

The electrode control circuit f2 includes a control power source Pc21, a bias power source Pc22 and a control portion f21. The control portion f21 can apply to the electrodes e21 and e22 the ion leading voltages corresponding to the polarity of the ions to be led toward the medium 12.

Under the control by the control portion f21, the positive and negative voltages are applied to the upper and lower electrodes e21 and e22, respectively, whereby the positive corona ions can be led to the medium (FIG. 4(A)). By applying the negative and positive voltages to the upper and lower electrodes e21 and e22, respectively, the positive corona ions can be confined (FIG. 4(B)).

The counter electrode (ground electrode) 1 opposed to the write electrode e2 is arranged.

Thus, the electric field-driving type medium 12 is sent from the timing rollers 2 at the timing of writing. While the medium 12 is moved relatively to the head H1, the positive corona ions are led, as shown in FIG. 4(A), to the pixel corresponding portion according to the image to be displayed, among a plurality of pixel corresponding portions, on the surface of the medium 12, under the control of the control portion f21, and the ion flow is hindered for other pixels, as shown in FIG. 4(B).

In this way, images can be written.

By use of such image forming device, electrostatic latent images were formed on the surface of the medium 12 such that the latent image potential at the image portion (black) was −400V, and the latent image potential at the background portion (white portion) was +400V, and solid (black) images, 2 cm×2 cm, were repeatedly written and erased on each reversible image display medium 12, the images being formed by stirring the developer particles with the magnet roller 5.

It was found that images are rewritable on any of the reversible image display media (namely which allow image formation, image erasure and rewriting of images). This means that the media can reduce consumption of image display media of paper or the like and consumable materials such as developers and ink used in the conventional image display. Accordingly the current demand for reduction in environmental loads can be satisfied. Further the media assure image formation with low energy and accordingly can meet the current need for reduction in environmental loads.

In the image formation on the media of examples and comparative examples, the initial reflection density of the solid portion (black reflection density B) and the initial reflection density of the background portion (white portion) (white reflection density W) were measured to give a initial image density ratio (reflection density ratio) (B/W).

The reflection density B of black solid portion was evaluated after the black/white reversal was 100 times repeated on the solid portion to find a change (Δ) from the initial reflection density of black solid.

The evaluation results are shown in Tables 3 and 4. In Table 3, if the B/W ratio was 5.0 or more, the evaluation result was good (circle). If it was less than 5.0, the evaluation result was unacceptable (X). In Table 4, if the reflection density was 1.2 or more and the reflection density change (Δ) was less than 0.2, the evaluation result was good (circle). If the reflection density was less than 1.2 or the reflection density change (Δ) was more than 0.2, the evaluation result was unacceptable (X).

The reflection densities of the solid portion and white portion were measured by a reflective densitometer (manufactured by Konika Co., Ltd., Sakura Desnsitometer PDA-65). The average particle size of developer particles was measured based on relative weight distribution with respect to particle sizes using a Coulter Multi-sizer (product of Coulter Co., Ltd.) having an aperture tube (280 $\mu$m).

The static resistivity (volume resistivity) $\rho$ ($\Omega \cdot$cm) of the developer particles was evaluated as follows. The sample was set on a metallic circular electrode to give a pile of 1 mm in thickness and 50 mm in diameter. On the pile were placed an electrode of 1 kg in mass and 20 mm in diameter and a guard electrode of 38 mm in inner diameter and 42 mm in outer diameter. The current value was measured one minute after applying a direct current voltage of 500 V. The static resistivity (volume resistivity) of the sample was calculated based on the current value. Any measuring method can be employed insofar as the measurement is made on the same principle.

The saturation magnetization degree σs (emu/g) of the magnetic developer particles was measured using a device for automatic recording of direct current magnetization characteristic (TYPE-3257, product of Yokogawa Hokushin Denki Co., Ltd.).

TABLE 3

| | Black Magnetic Particles BP | | | | Initial | Initial | | evaluation of |
| --- | --- | --- | --- | --- | --- | --- | --- | --- |
| | No. | σs (emu/g) | volume resistivity (Ω·cm) | WP | black portion R.D. | white portion R.D. | Initial B/W I.D.R. | Initial B/W I.D.R. |
| C. Ex. 1 | 8 | 19.5 | $2.00 \times 10^{13}$ | WP | 1.2 | 0.39 | 3.08 | X |
| Ex. 1 | 9 | 26.5 | $4.27 \times 10^{13}$ | WP | 1.38 | 0.27 | 5.11 | ○ |
| Ex. 2 | 7 | 35.9 | $1.62 \times 10^{13}$ | WP | 1.45 | 0.24 | 6.04 | ○ |
| Ex. 3 | 10 | 41.5 | $4.68 \times 10^{12}$ | WP | 1.5 | 0.2 | 7.50 | ○ |
| C. Ex. 2 | 11 | 57.8 | $1.26 \times 10^{11}$ | WP | 1.37 | 0.38 | 3.61 | X |

Ex.: Example
C. Ex.: Comparative Example
WP: white particles
R.D.: reflection density
I.D.R.: image density ratio

TABLE 4

| | Black Magnetic Particles BP | | | | Initial | black portion | change Δ of | |
| --- | --- | --- | --- | --- | --- | --- | --- | --- |
| | No. | σs (emu/g) | volume resistivity (Ω·cm) | WP | black portion R.D. | R.D. after 100 times | black portion R.D. | evaluation |
| C. Ex. 3 | 1 | 36 | $1.62 \times 10^{9}$ | WP | 1.1 | 1.05 | 0.05 | X |
| Ex. 4 | 2 | 35.9 | $1.22 \times 10^{10}$ | WP | 1.35 | 1.30 | 0.05 | ○ |
| Ex. 5 | 3 | 35.8 | $9.22 \times 10^{11}$ | WP | 1.44 | 1.38 | 0.06 | ○ |
| Ex. 6 | 7 | 35.9 | $1.62 \times 10^{13}$ | WP | 1.45 | 1.33 | 0.12 | ○ |
| Ex. 7 | 4 | 35.8 | $8.92 \times 10^{13}$ | WP | 1.44 | 1.30 | 0.14 | ○ |
| C. Ex. 4 | 5 | 36.2 | $1.10 \times 10^{14}$ | WP | 1.45 | 1.24 | 0.21 | X |
| C. Ex. 5 | 6 | 36 | $1.10 \times 10^{15}$ | WP | 1.5 | 1.18 | 0.32 | X |

Ex.: Example
C. Ex.: Comparative Example
WP: white particles
R.D.: reflection density As apparent from Table 3, if the saturation magnetization degree of the magnetic developer particles is less than 20 emu/g or more than 50 emu/g, a satisfactory image contrast can not be attained.

As evident from Table 4, if at least one kind of white and black developer particles has a volume resistivity ρ outside the range of $1.0 \times 10^{10}$ Ω·cm to $1.0 \times 10^{14}$ Ω·cm, the medium can not exhibit a stable image density for a long time.

[3-2]

Now, description is given below to other reversible image display media having the same structure as the reversible image display medium 12 shown in FIG. 1(A).

The developer particles and developer in the cells are described below in detail.

White Developer Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Co., Ltd.: CR-50) and 5 parts by weight of salicylic acid-zinc complex (minus-charge-controlling agent, Orient Chemical Co., Ltd.: Bontron E-84). The mixture was kneaded by a twin-axis extruder and then cooled. The mixture was roughly pulverized, then pulverized by a jet mill and classified with wind to obtain white fine powder which has a volume average particle size of 10.3 μm. To the white fine powder was added 0.3 part by weight of hydrophobic silica particles (Nihon Aerosil Co., Ltd.: Aerosil R-972). The mixture was mixed by a Henschel mixer to give white developer particles WP1 as shown below in Table 5.

White developer particles WP2–WP6 (see Table 7) were also prepared using 0.3 parts by weight of each of the fluidization agents shown below in Table 7 in place of the hydrophobic silica particles (Nihon Aerosil Co., Ltd.: Aerosil R-972).

TABLE 5

| White Particles WP1 | | | | |
| --- | --- | --- | --- | --- |
| bindr resin (parts by weight) | Titanium Oxide (parts by weight) | Bontron-E84 (parts by weight) | hydophobic silica R972 (parts by weight) | average particle size (μm) |
| 100 | 40 | 5 | 0.3 | 10.3 |

Black Developer Particles BP

In a Henschel mixer were thoroughly mixed 100 parts by weight of styrene-n-butyl methacrylate resin (softening point: 132° C., Tg: 65° C.), 12 parts by weight of carbon black (Lion Oil & Fat Co., Ltd.: Ketchen Black EC), 1.5 parts by weight of silica (Nihon Aerosil Co., Ltd.: # 200) and 200 parts by weight of magnetic powder containing magnetite (B-BL-P, Titan Kogyo Co., Ltd.). The mixture was kneaded by a kneader.

The mixture was cooled, roughly pulverized by a feather mill, then finely pulverized by a jet mill and classified with wind to obtain black magnetic particles of 26 μm in volume average particle size as shown in Table 6.

TABLE 6

Black Magnetic Particles BP

| bindr resin parts by weight | magnetic powder RB-BL-P parts by weight | carbon black parts by weight | silica Aerosil #200 parts by weight | average particle size (μm) | saturated magnetization σ s (emu/g) |
|---|---|---|---|---|---|
| 100 | 200 | 12 | 1.5 | 26 | 36 |

Preparation of Developer DL

Each of the white particles WP1 to WP6 (30 g) and the black particles BP (70 g) were placed into a polyethylene bottle. The bottle was rotated by a ball mill pedestal to perform the kneading and mixing operations for 30 minutes to obtain 6 types of developers. The white developer particles WP were negatively charged and black developer particles BP were positively charged in each developer.

Using the obtained 6 kinds of developers as the developer DL in the reversible image display medium 12 of FIG. 1(A), there were obtained media of Examples 8 to 12 and media of Comparative Examples 6 and 7, with the particulars as shown in Table 7. The developer was accommodated in each cell of the medium at a charging rate of 34 vol. % in each of the media of Examples and Comparative Examples.

such as developers and ink used in the conventional image display. Accordingly the current demand for reduction in environmental loads can be satisfied. Further the media assure image formation with low energy and accordingly can meet the current need for reduction in environmental loads.

In image formation on the media of examples and comparative examples, the reflection density (black reflection density B) of the solid portion and the reflection density (white reflection density W) of the background portion (white portion) were measured after 10 times repetition of black/white reversity to give an image density ratio (reflection density ratio) (B/W).

The evaluation results are shown in Tables 7 and 8. If the B/W ratio was 5.0 or more and less than 6.0, the evaluation result was good (circle). If it was more than 6.0, it was excellent (double circle). If it was less than 5.0, the evaluation result was unacceptable (X).

The reflection densities of the solid portion and white portion were measured by a reflective densitometer (manufactured by Konika Co., Ltd., Sakura Desnsitometer PDA-65).

The average particle size of developer particles was measured based on a particle size/relative weight distribution using a Coulter Multi-sizer (product of Coulter Co., Ltd.) having an aperture tube (280 μm).

TABLE 7

| | White Particles WP | | | | | | | evaluation |
|---|---|---|---|---|---|---|---|---|
| | No. | F. agent | BET s.s.a. m²/g | amount parts by weight | BP | black portion RD. | white portion R.D. | B/W I.D.R. | of B/W I.D.R. |
| C. Ex. 6 | 2 | MOX50 | 50 | 0.3 | BP | 1.37 | 0.33 | 4.15 | X |
| Ex. 8 | 3 | MOX80 | 80 | 0.3 | BP | 1.44 | 0.27 | 5.33 | ○ |
| Ex. 9 | 1 | R972 | 110 | 0.3 | BP | 1.55 | 0.24 | 6.46 | ⊙ |
| Ex. 10 | 4 | AEROSIL 200 | 200 | 0.3 | BP | 1.5 | 0.23 | 6.52 | ⊙ |
| Ex. 11 | 5 | AEROSIL 300 | 300 | 0.3 | BP | 1.47 | 0.25 | 5.88 | ○ |
| C. Ex. 7 | 6 | AEROSIL 380 | 380 | 0.3 | BP | 1.38 | 0.34 | 4.06 | X |

Ex.: Example
C. Ex.: Comparative Example
BP: black magnetic particles
R.D.: reflection density
I.D.R.: image density ratio
BET s.s.a.: BET specific surface area
F. agent: fluidization agent Using the developer (white particles WP1+black particles BP) as the developer DL in the reversible image display medium 12 of FIG. 1(A), there were obtained media of Examples 12 to 16 and media of Comparative Examples 5 and 9, with the particulars as shown in Table 8.

Medium evaluation tests were carried out to evaluate the media of examples and comparative examples using the image-forming device shown in FIG. 3.

By use of the image-forming device of FIG. 3, electrostatic latent images were formed on the surface of the each medium such that the latent image potential at the image portion (black) was −400V, and the latent image potential at the background portion (white portion) was +400V, and solid (black) images, 2 cm×2 cm, were repeatedly written and erased on each reversible image display medium.

It was found that images are rewritable on any of the reversible image display media (namely which allow image formation, image erasure and rewriting of images). This means that the media can reduce consumption of image display media of paper or the like and consumable materials

TABLE 8

| | | | packing density vol % | black portion R.D. | white portion R.D. | B/W I.D.R. | evaluation of B/W I.D.R. |
|---|---|---|---|---|---|---|---|
| C. Ex. 8 | WP1 | BP | 15 | 1.31 | 0.40 | 3.28 | X |
| Ex. 12 | WP1 | BP | 20 | 1.41 | 0.28 | 5.04 | ○ |
| Ex. 13 | WP1 | BP | 25 | 1.55 | 0.25 | 6.20 | ⊙ |
| Ex. 14 | WP1 | BP | 30 | 1.55 | 0.24 | 6.46 | ⊙ |
| Ex. 15 | WP1 | BP | 35 | 1.57 | 0.23 | 6.82 | ⊙ |
| Ex. 16 | WP1 | BP | 50 | 1.55 | 0.26 | 5.96 | ○ |
| C. Ex. 9 | WP1 | BP | 55 | 1.32 | 0.38 | 3.47 | X |

Ex.: Example
C. Ex.: Comparative Example
WP1: white particles
BP: black magnetic particles
R.D.: reflection density
I.D.R.: image density ratio As apparent from Table 7, in any case of smaller BET specific surface area as in Comparative Example 6 or greater BET specific surface area as in Comparative Example 7 than the foregoing specified range of BET specific surface area of 80 m$^2$/g to 300 m$^2$/g, the fluidity of developer particles was not satisfactory and black particles were observed to adhere to the solid white portion, so that the media did not exhibit sufficient contrast.

As evident from Table 8, if the packing density (charging rate) of the developer in the cell of the medium was lower as in Comparative Example 8, the underlying layer of black particles was seen through the solid white portion, and the reflection density of solid white portion was increased, while the underlying layer of white particles was seen through the solid black portion, and thereby the image density was decreased.

On the other hand, if the packing density of the developer was higher as in Comparative Example 9, the resistance to movement of developer particles was higher in the development, so that the black particles were developed at the solid white portion, and at the same time the white particles were developed at the solid black portion, resulting in reduction of contrast.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reversible image display medium comprising:
   two substrates opposed to each other with a predetermined gap therebetween;
   one or more developer-accommodating cells formed between the two substrates; and
   a dry developer accommodated in each cell,
   wherein
   the dry developer contains at least two kinds of frictionally chargeable dry developer particles having different chargeable polarities and different optical reflection densities, at least one kind of the dry developer particles being magnetic particles containing a binder resin having a magnetic substance incorporated therein, the magnetic particles having a saturation magnetization degree in the range of 20 emu/g to 50 emu/g.

2. A reversible image display medium comprising:
   two substrates opposed to each other with a predetermined gap therebetween;
   one or more developer-accommodating cells formed between the two substrates; and
   a dry developer accommodated in each call,
   wherein
   the dry developer contains at least two kinds of frictionally chargeable dry developer particles having different chargeable polarities and different optical reflection densities, at least one kind of the dry developer particles having a volume resistivity ρ in the range of 1.0×10$^{10}$ Ω·cm to 1.0×10$^{14}$ Ω·cm.

3. A reversible image display medium comprising:
   two substrates opposed to each other with a predetermined gap therebetween;
   one or more developer-accommodating cells formed between the two substrates; and
   a dry developer accommodated in each cell,
   wherein
   the dry developer contains at least two kinds of frictionally chargeable dry developer particles having different chargeable polarities and different optical reflection densities, at least one kind of the dry developer particles being magnetic particles containing a binder resin having a magnetic substance incorporated therein, the magnetic particles having a saturation magnetization degree in the range of 20 emu/g to 50 emu/g, and at least one kind of the dry developer particles having a volume resistivity ρ in the range of 1.0×10$^{10}$ Ω·cm to 1.0×10$^{14}$ Ω·cm.

4. A reversible image display medium comprising:
   two substrates opposed to each other with a predetermined gap therebetween;
   one or more developer-accommodating cells formed between the two substrates; and
   a dry developer accommodated in each cell,
   wherein
   the dry developer contains inorganic fine powder as a fluidization agent, the inorganic fine powder having a BET specific surface area of 80 m$^2$/g to 300 m$^2$/g.

5. The reversible image display medium according to claim 4, wherein the inorganic fine powder are incorporated in at least one kind of the developer particles.

6. The reversible image display medium according to claim 4, wherein the dry developer is accommodated in the cell in an amount of 20 vol. % to 50 vol. % based on the volume of the cell.

7. The reversible image display medium according to claim 5, wherein the dry developer is accommodated in the cell in an amount of 20 vol. % to 50 vol. % based on the volume of the cell.

8. A reversible image display medium comprising:
   two substrates opposed to each other with a predetermined gap therebetween;
   one or more developer-accommodating cells formed between the two substrates; and
   a dry developer accommodated in each cell,
   wherein
   the dry developer is accommodated in the cell in an amount of 20 vol. % to 50 vol. % based on the volume of the cell.

9. The reversible image display medium according to claim 4, wherein the dry developer contains at least two kinds of frictionally chargeable dry developer particles having different chargeable polarities and different optical reflection densities.

10. The reversible image display medium according to claim 6, wherein the dry developer contains at least two kinds of frictionally chargeable dry developer particles having different chargeable polarities and different optical reflection densities.

11. The reversible image display medium according to claim 8, wherein the dry developer contains at least two kinds of frictionally chargeable dry developer particles having different chargeable polarities and different optical reflection densities.

12. A reversible image display medium comprising:
   two substrates opposed to each other with a predetermined gap therebetween;
   one or more developer-accommodating cells formed between the two substrates; and
   a dry developer accommodated in each cell, wherein
   the dry developer contains at least two kinds of frictionally chargeable dry developer particles having different chargeable polarities and different optical reflection densities, at least one kind of the dry developer particles being magnetic particles having a saturation magnetization degree in the range of 20 emu/g to 50 emu/g.

13. A reversible image display medium comprising:

two substrates opposed to each other with a predetermined gap therebetween;

one or more developer-accommodating cells formed between the two substrates; and a dry developer accommodated in each cell, wherein the dry developer contains dry developer particles having a volume resistivity $\rho$ in the range of $1.0 \times 10^{10}$ $\Omega \cdot cm$ to $1.0 \times 10^5$ $\Omega \cdot cm$ and an inorganic fluidization agent.

14. A reversible image display medium comprising:

two substrates opposed to each other with a predetermined gap therebetween;

one or more developer-accommodating cells formed between the two substrates; and a dry developer accommodated in each cell, wherein the dry developer contains dry developer particles having a volume resistivity $\rho$ in the range of $1.0 \times 10^{10}$ $\Omega \cdot cm$ o $1.0 \times 10^{14}$ $\Omega \cdot cm$ and an inorganic fine powder adhered thereto.

15. A reversible image display medium comprising:

two substrates opposed to each other with a predetermined gap therebetween;

one or more developer-accommodating cells formed between the two substrates; and a dry developer accommodated in each cell, wherein the dry developer contains inorganic fine powder as a fluidization agent.

16. A reversible image display medium comprising:

two substrates opposed to each other with a predetermined gap therebetween;

one or more developer-accommodating cells formed between the two substrates; and a dry developer accommodated in each cell, wherein the dry developer contains at least two kinds of frictionally chargeable dry developer particles having different chargeable polarities and different optical reflection densities, and at least one kind of the dry developer particles contains an inorganic fluidization agent.

17. A reversible image display medium comprising:

two substrates opposed to each other with a predetermined gap therebetween;

one or more developer-accommodating cells formed between the two substrates; and a dry developer accommodated in each cell, wherein the dry developer contains at least one kind of particles containing resin, and an inorganic fine powder is adhered to the particles.

18. A reversible image display medium comprising:

two substrates opposed to each other with a predetermined gap therebetween;

one or more developer-accommodating cells formed between the two substrates; and a dry developer accommodated in each cell, wherein the dry developer contains at least one kind of particles formed of particle being small in diameter and having an resin adhered thereto, and an inorganic fine powder is adhered to a circumferential surface of the particles.

19. The reversible image display medium according to claim 11, wherein the dry developer contains an inorganic fluidization agent.

* * * * *